H. W. Sabin,
Horse Rake.

No. 1915 Reissued. Mar: 28, 1865

Witnesses.
R. T. Campbell
E. Schaefer.

Thos. Mason
Robert W. Emmick
Benito C. Lawrence
Assignees

UNITED STATES PATENT OFFICE.

CHAS. MASON, ROBERT W. FENWICK, AND DE WITT C. LAWRENCE, OF WASHINGTON, DISTRICT OF COLUMBIA, ASSIGNEES, BY MESNE ASSIGNMENTS, OF HARVEY W. SABIN.

IMPROVEMENT IN HORSE-RAKES.

Specification forming part of Letters Patent No. 7,813, dated December 3, 1850; extended seven years; Reissue No. 1,915, dated March 28, 1865.

DIVISION NO. 4.

*To all whom it may concern:*

Be it known that HARVEY W. SABIN, late of Canandaigua, in the county of Ontario and State of New York, now deceased, was the originator of certain new and useful inventions and Improvements in Horse-Rakes, for which Letters Patent of the United States were granted him for the term of fourteen years from the 3d day of December, 1850, and that the said patent was duly renewed and extended for the term of seven years from and after the expiration of the first term—viz., from December 3d, 1864—and which patent so extended was, on the 5th day of December, 1864, duly assigned to CHARLES MASON, ROBERT W. FENWICK, and DE WITT C. LAWRENCE, of Washington city, in the District of Columbia; and we, the said CHARLES MASON, ROBERT W. FENWICK, and DE WITT C. LAWRENCE, do hereby declare that the following is a full, clear, and exact description of the construction of that part of the invention which we designate a "tubular-joint rake-tooth," reference being had to the accompanying drawings and letters of reference marked thereon, forming part of this specification, in which—

Figure 3:
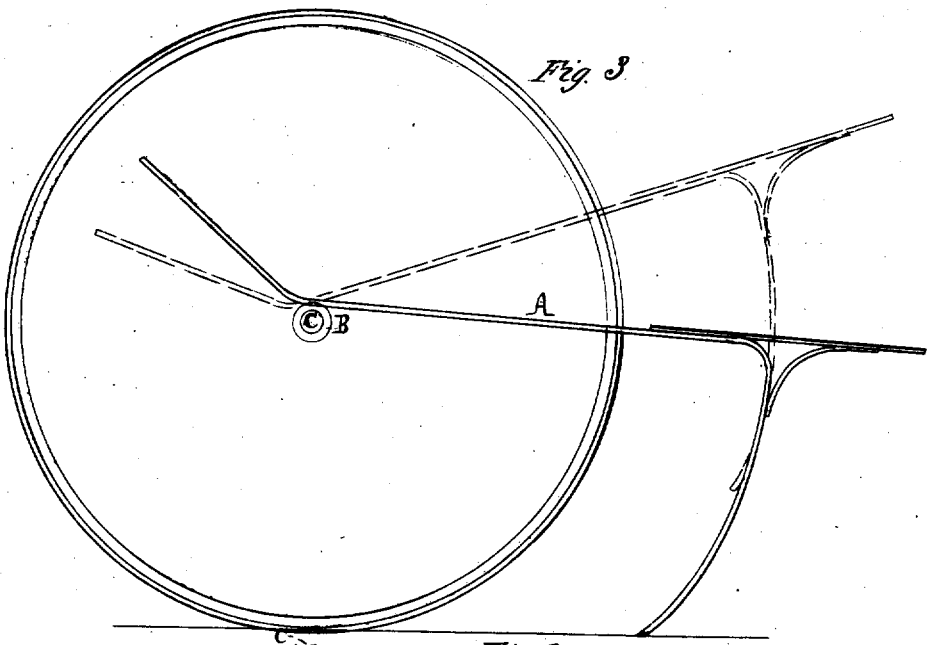
Figure 2:
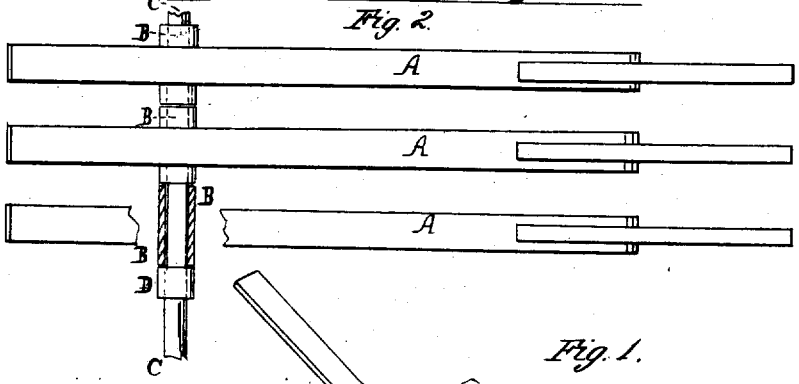
Figure 1:
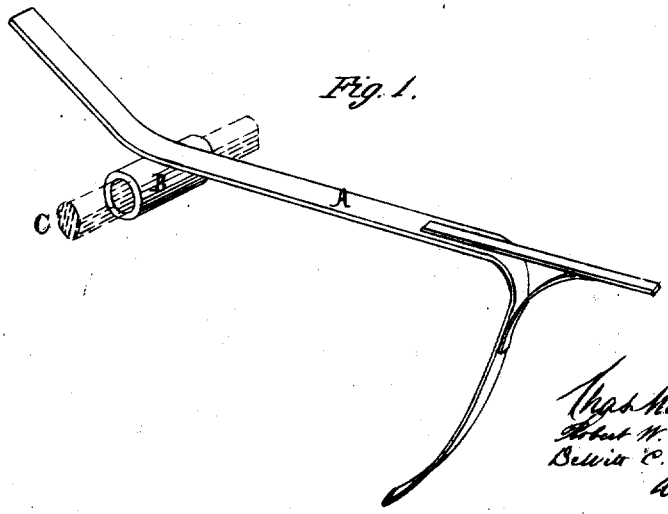

Figure 1 is a perspective view of a rake-tooth with a tubular eye-bearing applied to it. Fig. 2 is a plan view, showing a portion of the axial shaft of the rake-teeth, and also several tubular-joint teeth arranged to articulate upon this shaft. One of the tubular joints or eye-bearings is shown in section, and a portion of one of the teeth is broken out at said joint. Fig. 3 is a vertical longitudinal section of a portion of a wheeled rake with tubular-joint rake-teeth arranged upon the carriage-axle.

Similar letters of reference in the several figures indicate corresponding parts.

The nature of the invention covered by this patent consists in arranging springy metal rake-teeth on their articulating and laterally bracing and supporting eye-bearings in such manner that the attaching end of the teeth shall cross or intersect a vertical plane passing longitudinally through the axis of the bearings.

To enable others to make and use this invention, we will proceed to describe the same with reference to the drawings.

It is important to have rake-teeth light and springy, and at the same time firm against lateral movement and strain when in the act of raking or gathering hay; also, to have such teeth set or spaced apart on their supporting-shaft in order that the rake shall be light. It is further important to have the teeth capable of collective and independent articulation, in order that the teeth may singly or collectively rise to pass over unyielding obstructions, and that the gathered hay may be discharged; and it is further very important that the teeth may be attached to the tubular bearings in such a manner as to be capable of yielding from the points of their attachment to their gathering extremities, and at the same time be supported by a rod or axial shaft situated directly under the points where they attach to the eye-bearings.

In order, therefore, to produce a spring-rake combining the several important advantages above enumerated, the bearing B of each tooth A is made of a separate piece of metal from that of which the tooth is made; hence the tooth may be made of narrow spring metal, while its bearing to which it is to be affixed may be made of any desired metal, and of a length sufficient to give the tooth the necessary lateral support and bearing upon the axial shaft. The tooth is fixed in a secure manner to the bearing at the highest point thereof, or in a plane which intersects a vertical plane passing longitudinally through the axes of said bearing, and thus the necessity of inserting the end of the tooth into a horizontal tube of the eye-bearing, and thereby making a portion of the tooth stiff or rigid, and consequently liable to break under pressure, is obviated. Besides this, the tooth is sustained against the downward pressure which is brought upon it at a point between its gathering extremity and its attaching end. To make the invention more plain, we will state that through its agency the attaching portion of the tooth can be made with a springy nature, and thus the whole tooth, from the point of its attachment to the tubular or laterally-bracing eye-bearing to its gathering extremity, is a spring of a capacity or volume much greater than is obtained in other teeth used upon a rod which is the same height from the ground as the rod on which this improved arrangement of tooth is placed. Beside this, the forward parts of teeth being attached circumferentially or tangentially to the bearings, the same are sustained directly upon the axial rod of said bearings, and thus not only may a firm connection between the teeth, their bearings, and their axial shaft be secured, but such a one as will sustain the teeth against all ordinary lateral thrusts and downward force of the pressure-bar, which is generally used to keep them to their work of gathering hay.

We have set forth the importance of making the raking contrivance of a hay-rake as light as possible; but as this must not be done at the expense of strength it is a matter of no little importance to secure in the same implement both strength and lightness without increasing the cost of the same. These essentials are attained by using the laterally-bracing eye-bearings and fastening the teeth to them in such manner that their attaching ends will cross or intersect the vertical plane of said bearings, or so that the weight of the forward parts of the teeth will fall directly over or on the bar upon which the bearings are placed, and upon which they articulate, and thus any pressure which may be applied between the attaching and raking ends of the teeth will be borne by said rod in such manner that the breaking of the teeth will seldom, if ever, occur.

The rake-teeth are represented as having their support upon the carriage-axle C of the rake in such manner that each tooth may articulate freely thereon.

For raising the rake-teeth collectively, a tilting frame may be arranged to articulate upon the axial shaft of the teeth, so as to operate with a downward pressure at the will of the operator upon the forward extensions of the teeth; and for keeping the teeth down to their work a pressure-frame may be arranged to articulate upon the axle and press down upon the teeth in rear of the axle. The said tilting frame and the pressure-frame may be controlled by a hand-lever and a tripping device which articulate together upon the axle.

The arrangement of the tilting frame, pressure-frame, lever, and other contrivances are claimed under Division No. 2 of this reissue, to which reference is made for a more particular description thereof; but these devices constitute no part of the invention claimed under this patent.

Whenever it is desired to have the teeth placed or spaced a greater distance apart than the length of the eye-bearings will permit, rings D may be introduced between the abutting ends of the bearings, as indicated in the drawings.

The series of tubular or eye bearings for a series of spaced rake-teeth are held together against longitudinal displacement on their axial shaft by means of stops, which in this case are the hubs of the wheels of the rake-carriage.

In Fig. 2 the manner in which the teeth are arranged upon the axial shaft is clearly shown, and in Fig. 3 the position of the teeth while raking is represented by black lines, and their position while discharging their load of gathered hay is shown by red lines.

What we claim, and desire to secure by Letters Patent of the United States, is—

Arranging rake-teeth on articulating tubular laterally-bracing and vertically-supporting eye-bearings, so that the attaching end of each tooth shall cross or intersect a vertical plane passing longitudinally through the axis of the bearings, substantially as described.

CHAS. MASON.
ROBERT W. FENWICK.
DE WITT C. LAWRENCE.

Witnesses:
R. T. CAMPBELL,
E. SCHAFER.